US010085416B2

(12) United States Patent
Link et al.

(10) Patent No.: US 10,085,416 B2
(45) Date of Patent: Oct. 2, 2018

(54) DOOR FOR A PET ENCLOSURE

(71) Applicant: Precision Pet Products, Inc., Costa Mesa, CA (US)

(72) Inventors: David Link, Costa Mesa, CA (US); Hongkun Liang, Zhongshan (CN)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 0 days.

(21) Appl. No.: 14/716,025

(22) Filed: May 19, 2015

(65) Prior Publication Data
US 2016/0014996 A1 Jan. 21, 2016

Related U.S. Application Data

(60) Provisional application No. 62/027,046, filed on Jul. 21, 2014.

(51) Int. Cl.
*A01K 1/03* (2006.01)
(52) U.S. Cl.
CPC .................. *A01K 1/034* (2013.01)
(58) Field of Classification Search
CPC ........ A01K 1/034; A01K 1/0017; A01K 1/00; A01K 1/02
USPC ....................................................... 119/481
See application file for complete search history.

(56) References Cited

U.S. PATENT DOCUMENTS

| 3,896,766 | A | 7/1975 | Martin |
| 4,016,833 | A | 4/1977 | Ray |
| 4,140,080 | A | 2/1979 | Snader |
| 4,527,512 | A | 7/1985 | Sugiura |
| 4,590,885 | A | 5/1986 | Sugiura |
| 4,762,085 | A | 8/1988 | Ondrasik |
| 4,763,606 | A | 8/1988 | Ondrasik, II |
| 4,917,047 | A | 4/1990 | Wazeter, III |
| 5,097,796 | A | 3/1992 | Reimers |
| 5,233,939 | A | 8/1993 | Randolph |
| 5,335,618 | A | 8/1994 | Zarola |
| 5,482,005 | A | 1/1996 | Thom |
| 5,544,619 | A | 8/1996 | Braun |
| 5,549,073 | A | 8/1996 | Haskins et al. |
| 5,564,367 | A * | 10/1996 | Boyanton ................ A01K 3/00 119/474 |
| 5,626,098 | A | 5/1997 | Haskins et al. |
| 5,653,194 | A | 8/1997 | Guy |
| 5,727,502 | A * | 3/1998 | Askins .................... A01K 1/034 119/499 |
| 5,752,470 | A | 5/1998 | Koneke |
| 5,950,568 | A | 9/1999 | Axelrod et al. |
| 5,967,089 | A | 10/1999 | Allen |
| 6,092,488 | A | 7/2000 | Allawas |

(Continued)

OTHER PUBLICATIONS

Precision Pet Products, "Suitcase Crate", photo.
(Continued)

*Primary Examiner* — Jessica B Wong
(74) *Attorney, Agent, or Firm* — Global IP Counselors, LLP

(57) ABSTRACT

A door for a pet enclosure is disclosed herein. The door is vertically and rotatably traversable with dual axes connectors. The door may be vertically traversed to unlatch hooks and wire rods from each other so that the door may thereafter be rotatably traversed to the opened position where the door is disposed on top of the top panel.

11 Claims, 10 Drawing Sheets

(56) References Cited

U.S. PATENT DOCUMENTS

| | | | |
|---|---|---|---|
| 6,152,081 A | 11/2000 | Baker | |
| 6,155,206 A | 12/2000 | Godshaw | |
| 6,192,834 B1 | 2/2001 | Kolozsvari | |
| 6,631,590 B1 | 10/2003 | Glowaski | |
| 6,681,720 B1* | 1/2004 | Skurdalsvold | A01K 1/03 119/461 |
| 6,883,463 B2 | 4/2005 | Link | |
| 7,805,808 B2* | 10/2010 | Matteson | A01K 1/03 119/452 |
| 7,918,188 B1* | 4/2011 | Harper | A01K 1/0245 119/481 |
| 8,925,492 B2 | 1/2015 | Cantwell et al. | |
| 2002/0100431 A1* | 8/2002 | Sherman | A01K 1/034 119/499 |
| 2005/0034679 A1* | 2/2005 | Link | A01K 1/0245 119/474 |
| 2006/0260972 A1* | 11/2006 | Ayres | A01K 1/0245 206/512 |
| 2009/0314220 A1* | 12/2009 | Groh | A01K 1/034 119/502 |
| 2010/0300371 A1* | 12/2010 | Oeltjen | A01K 1/034 119/474 |
| 2011/0132274 A1* | 6/2011 | Cagle | A01K 1/0245 119/498 |
| 2012/0186529 A1* | 7/2012 | Cantwell | A01K 1/0245 119/474 |
| 2012/0186530 A1* | 7/2012 | Cantwell | A01K 1/034 119/474 |
| 2012/0210947 A1* | 8/2012 | DiPaolo | A01K 15/02 119/472 |
| 2012/0227328 A1* | 9/2012 | Link | A01K 1/0017 49/394 |
| 2012/0227675 A1* | 9/2012 | Link | A01K 3/00 119/474 |
| 2013/0152867 A1* | 6/2013 | Kaneda | A01K 1/034 119/502 |
| 2014/0109839 A1* | 4/2014 | Cantwell | A01K 1/034 119/481 |
| 2014/0216354 A1* | 8/2014 | Cantwell | A01K 1/0017 119/481 |
| 2015/0047572 A1* | 2/2015 | Rybka | A01K 15/02 119/479 |

OTHER PUBLICATIONS

Photograph of Pet Enclosure, Mar. 11, 2004.
Photograph of Pet Enclosure, Jan. 12, 2006.
Photo of Pet Enclosure, published at least as early as 2007.
Precision Pet Products, Inc., Wire Crates, Exercise Pens and Accessories, published at least as early as 2007.

* cited by examiner

DOOR FOR A PET ENCLOSURE

CROSS-REFERENCE TO RELATED APPLICATIONS

The present application claims priority to, and the benefit of, U.S. Provisional Application Ser. No. 62/027,046 entitled "Door For A Pet Enclosure" filed on Jul. 21, 2014, the disclosure of which is herein incorporated by reference in its entirety.

STATEMENT RE: FEDERALLY SPONSORED RESEARCH/DEVELOPMENT

Not Applicable

BACKGROUND

The various embodiments described herein relate to a door for a pet enclosure.

Pet enclosures are utilized for numerous purposes such as potty training a pet. The pet enclosure must enable the owner to retain the pet within an enclosed area. However, at certain times the pet owner would like to release the pet from the enclosed area. In order to do so, current prior art pet enclosures include doors that allow the pet to exit or enter the pet enclosure. Unfortunately, pet doors of prior art pet enclosures are cumbersome to operate.

Accordingly, there is a need the art for an improved pet door.

BRIEF SUMMARY

A door for a pet enclosure is disclosed. The door is rotatably attachable to an upper corner of the side panel in which the door opening is formed and the top panel. The door is rotated upward and disposed on the top panel when the door is in the opened position. The door does not interfere with the movement of the pet or owner during use. Rather, the door is neatly stacked on the top panel for convenient storage during use. The door is connected to the upper corner of the side panel and top panel with a dual axes connector. The dual axes connector has first and second grooves which respectively receive a wire rod in the upper corner region of the side panel/top panel and a horizontal wire rod of the door. This allows the door to be vertically traversed upward before it is rotated up to the opened position. The door may have inverted hooks disposed about a periphery of the door. The inverted hooks engage horizontal wire rods of the side panel when the door is in the closed position. To traverse the door to the opened position, the inverted hooks disengage from the horizontal wire rods of the side panel when the door is vertically traversed upward. Once the inverted hooks are disengaged from the horizontal wire rods of the side panel, the door may be rotated up and disposed on the top panel of the enclosure.

More particularly, an enclosure for a pet is disclosed. The enclosure may comprise a plurality of side panels, a door, a pivot attachment mechanism and a vertical latch. The plurality of side panels may define an enclosed area. Each side panel may be formed from a plurality of horizontal and vertical wire rods. A first side panel of the plurality of side panels may have a door opening for ingress and egress of the pet into and out of the enclosed area. The door may be pivotally attached to a first wire rod disposed in an upper corner region of the first side panel and a top panel of the plurality of side panels. The door may be traversed between a closed position and an opened position. The door may be sufficiently large to cover the door opening to prevent ingress and egress of the pet through the door opening when the door is traversed to the closed position. The pivot attachment mechanism may define first and second grooves. The first and second pivot grooves may define first and second pivot axes which are parallel to each other and set apart a first distance. The first wire rod is rotatably disposed within the first groove. An upper wire rod of the door is rotatably disposed within the second groove so that the door is pivotally attached to the upper corner region about two axes. The vertical latch may be attached to the door or the first side panel and operative to engage a second horizontal wire rod of the first side panel or the door when the door is in the closed position and disengage the second horizontal wire rod of the first side panel or the door to traverse the door to the opened position.

The first distance between the first and second pivot axes of the pivot attachment mechanism may provide for vertical traversal of the door so that the latch vertically clears a mating horizontal wire rod of the door or the first side panel to disengage the vertical latch from the second horizontal wire rod of the first side panel or the door to traverse the door to the opened position.

The vertical latch may be an upright hook attached to the door which is removably engageable to the second horizontal wire rod of the door. Alternatively, the vertical latch may be an inverted hook attached to the first side panel which is removably engageable to the second horizontal wire rod of the door. As a further alternative, the vertical latch may be an inverted tab attached to the door which is removably engageable to the second wire rod of the first side panel. As a further alternative, the vertical latch may be an upright tab attached to the first side panel which is removably engageable to the second wire rod of the door.

The first distance between the first and second axes may be ½ or more a depth of the opening of the inverted hook so that the inverted hook clears the second horizontal wire rod when vertically traversing the door.

The plurality of dual axes connectors may pivotally attach the door to the upper corner region. A plurality of the vertical latches may be disposed about the left and right sides of the door and door opening and the latch is disposed adjacent to a lower edge portion of the door for providing reinforcement to all four sides of the door.

In another aspect, a method of opening a door of a side panel, the method may comprise the steps of vertically traversing a door; rotating a dual axes connector rotatably attached to a wire rod of the door and a wire rod of an upper region of the side panel; disengaging a vertical latch from a horizontal wire rod of the door or the side panel; rotating the door about an upper region of the side panel.

In the method, the disengaging step may include the step of simultaneously disengaging a plurality of vertical latches from the horizontal wire rod of the door or the side panel upon vertical traversal of the door.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
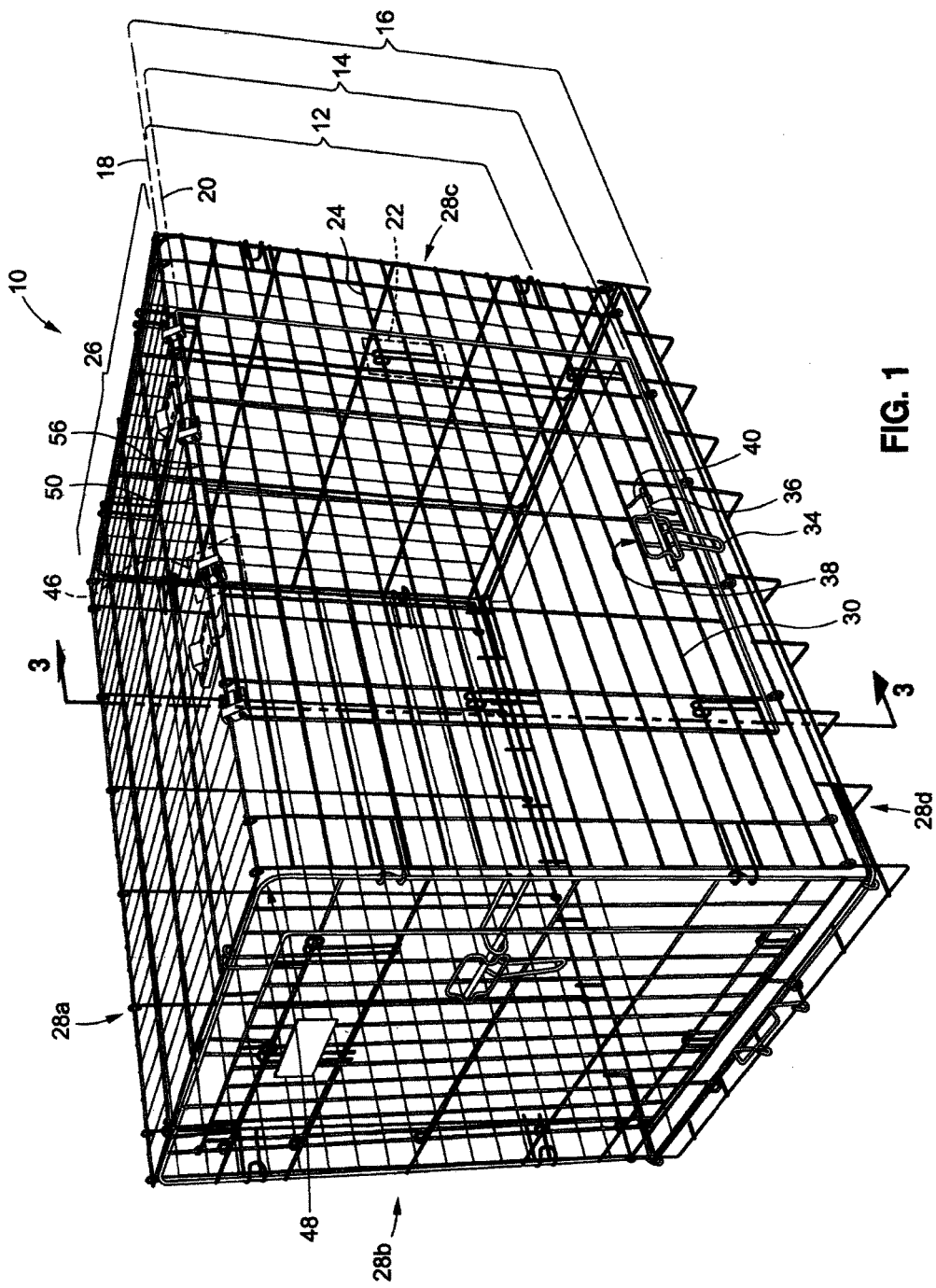
FIG. 1 is a perspective view of a pet enclosure with a door.
Figure 2:
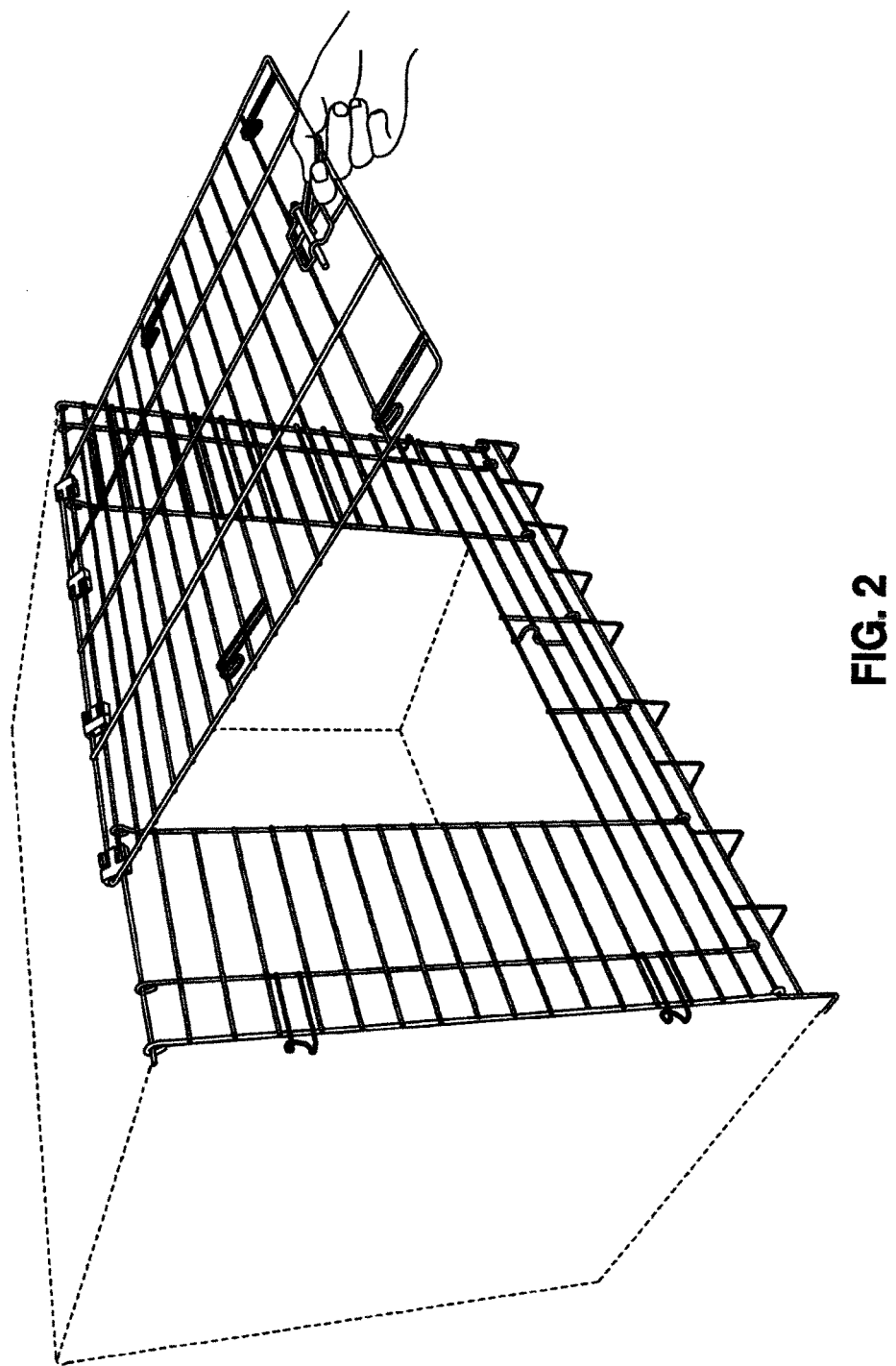
FIG. 2 is an enlarged perspective view of the pet enclosure with the door focusing on a side panel and door of the pet enclosure.

Referring now to the drawings, a pet enclosure 10 which permits ingress and egress of a pet through a door opening 12 is shown. The door opening 12 may remain open so that the pet may enter or exit the pet enclosure 10 at will or upon instruction of an owner. The door opening 12 may also be blocked with a door 14 that can be rotated upward and out of the way so that the door 14 does not interfere with the owner or pet during use. The door 14 may be rotatably attached to a side panel 16 in which the door opening 12 is formed or a top panel 26 so as to rotate about two pivot axes 18, 20.

Dual axes 18, 20 rotational movement of the door 14 to the side panel 16 allows the door 14 to be vertically traversed to unlatch one or more hooks 22 of the door 14 from one or more horizontal wire rods 24 of the side panel 16 so that the door 14 can thereafter be rotated up and disposed on the top panel 26 to keep the door 14 in the opened position and out of the way of the owner and pet. A plurality of hooks 22 may be disposed about the outer periphery of the door 14 for engagement with one or more horizontal wire rods 24 of the side panel 16 to strengthen the door 14 around its periphery. In this way, larger and stronger pets cannot bend the door 14 open to escape out of the enclosure 10.

More particularly, referring now to FIG. 1, the pet enclosure 10 may have a plurality of panels 16, 26, 28a-d that form an area in which the pet may be contained for potty training and other purposes. The various embodiments and aspects disclosed herein relate to a pet enclosure 10. However, other configurations are also contemplated. By way of example and not limitation, the side panel 16 with door 14 may have attachments on the left and right end portions for attachment to left and right walls of a hallway. The side panel 16 may be used to form a barrier to limit the pet's ability to traverse through the hallway unless the door 14 is open. Additionally, instead of an enclosure 10, the side panel 16 with door 14 may be incorporated into a plurality of panels that may be erected to form a playpen. The side panel 16 with door 14 serves as an entry and exit for the pet into and out of the area enclosed by the playpen.

The door 14 and panels may be fabricated from a plurality of horizontal and vertical wire rods. Although the door 14 and the panels 16, 26, 28a-d are shown and described as being fabricated from a plurality of transverse wire rods, it is contemplated that the panels 16, 26, 28a-d may have other configurations and still incorporate the various aspects and embodiments described herein.

The door 14 may have a plurality of inverted hooks 22 disposed about the peripheral portion of the door 14. The inverted hooks 22 engage the horizontal wire rods 24 of the side panel 16 to prevent the pet contained inside the pet enclosure 10 from bending the door 14 when the door 14 is in the closed position to escape out of the pet enclosure 10.

The inverted hooks 22 may be welded to the horizontal wire rods 30 of the door 14 and then curved downward so as to form a mouth (see FIG. 3) that opens downward. The inverted hooks 22 engage the wire rods 24 of the side panel 16 as the door 14 is traversed vertically downward. The inverted hooks disengage the wire rods 24 of the side panel 16 as the door 14 is traversed vertically upward.

Figure 4:
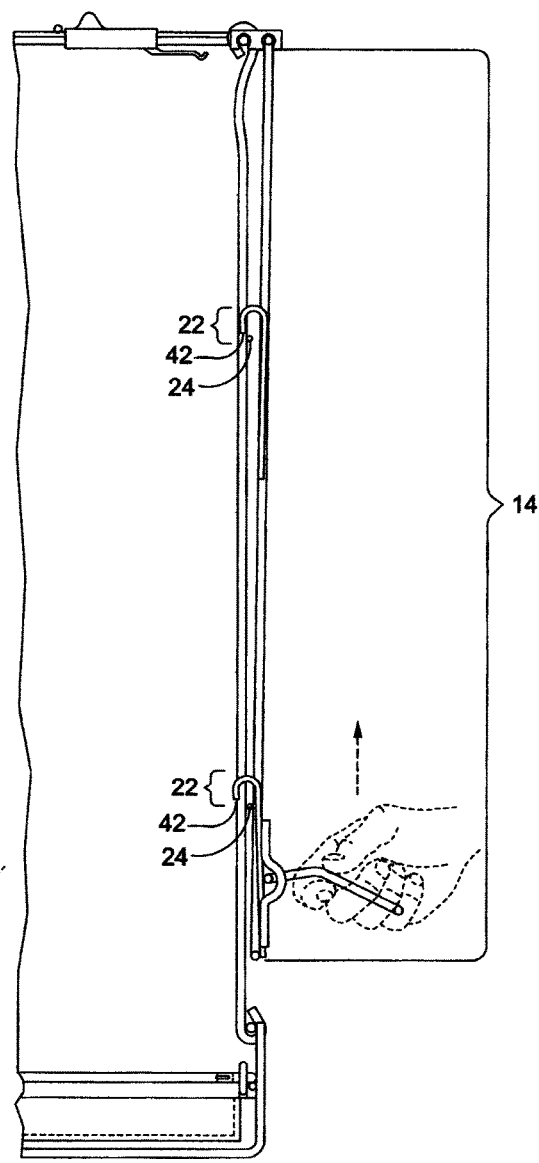
FIG. 4 is a cross-sectional view of the side panel and door shown in FIG. 3 as the door is being traversed vertically.
Figure 5:
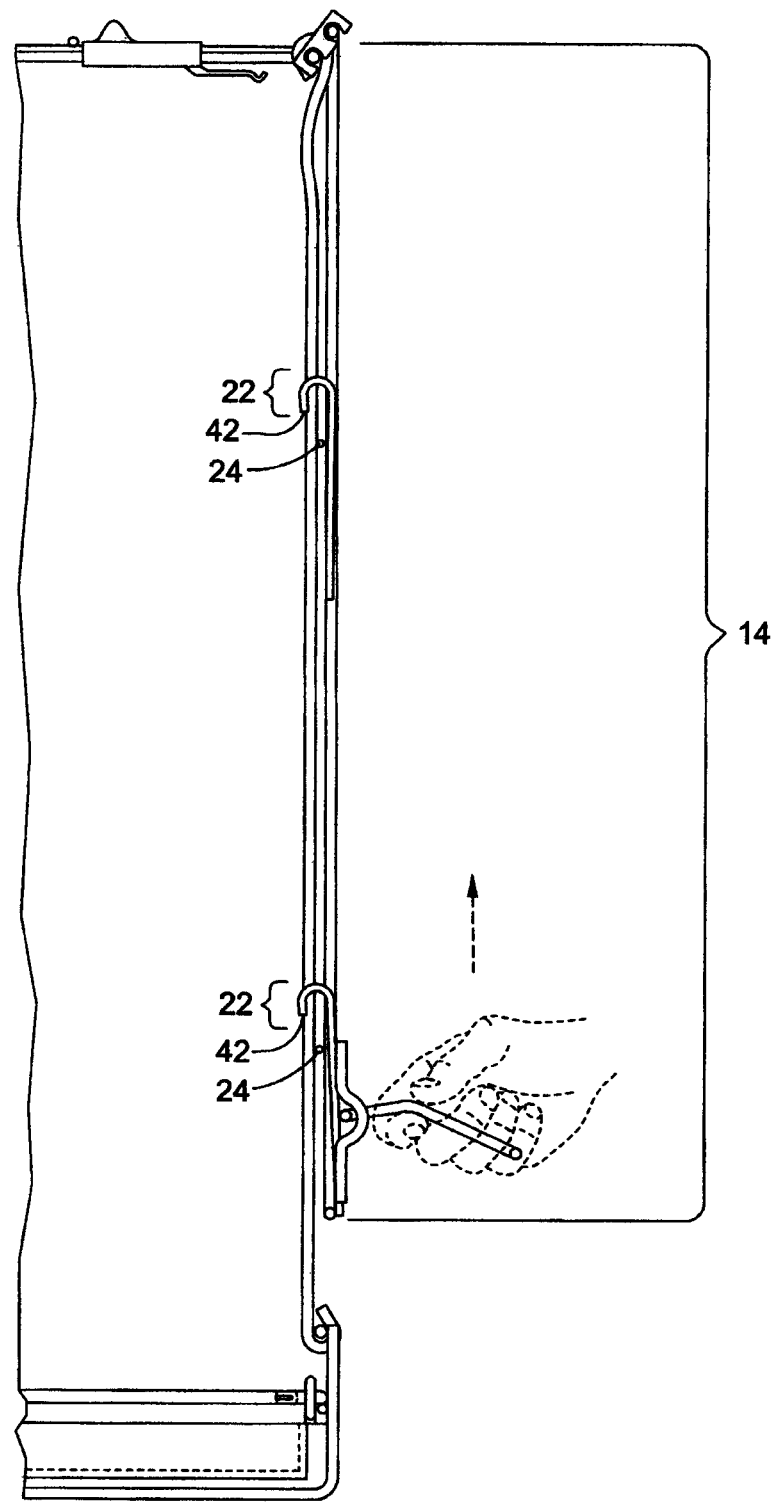
FIG. 5 is a cross-sectional view of the side panel and door shown in FIG. 4 as the door continues its vertical traversal from the position shown in FIG. 4.
Figure 6:
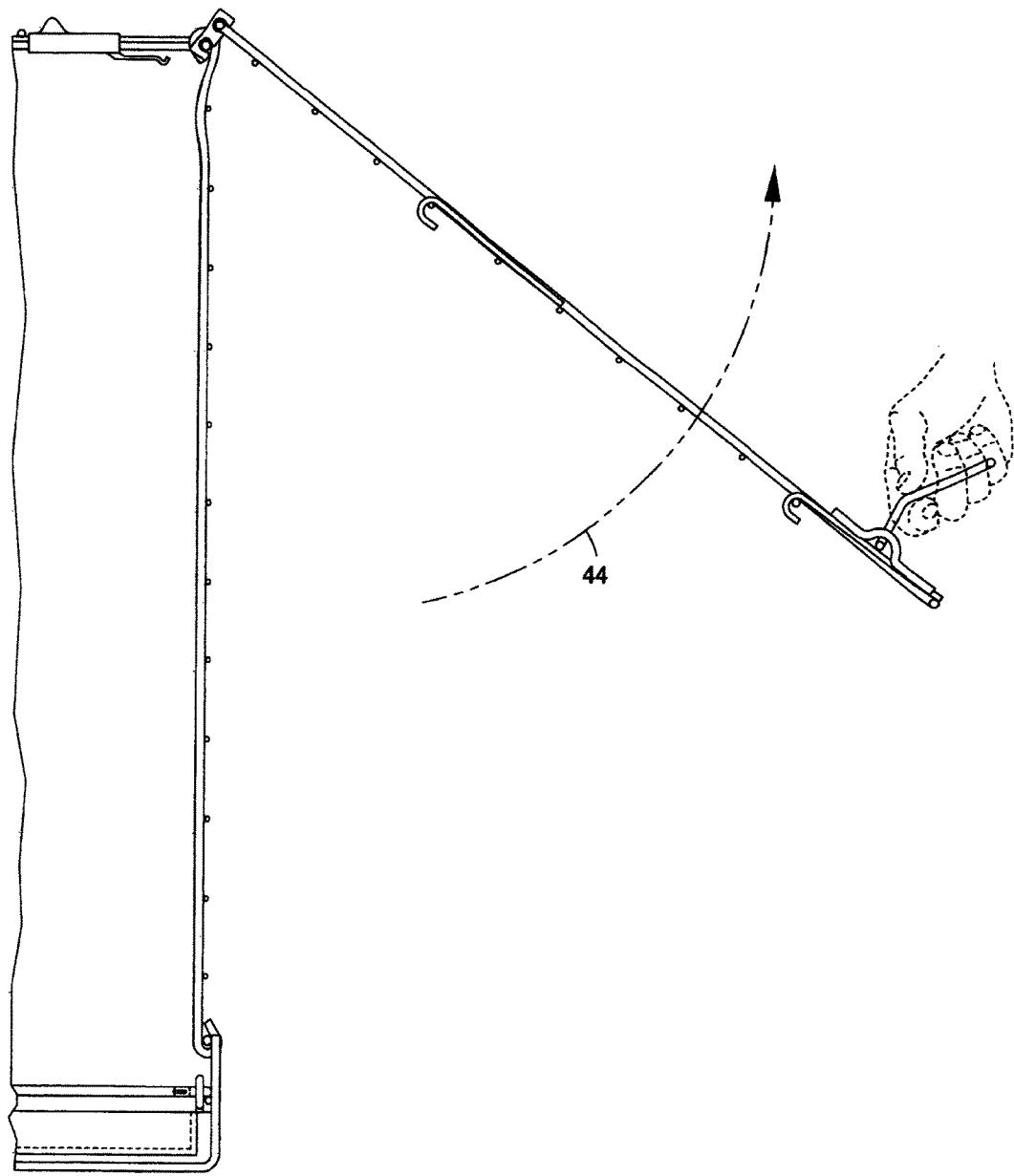
FIG. 6 is a cross-sectional view of the side panel and door as the door is rotated to an opened position.
Figure 7:
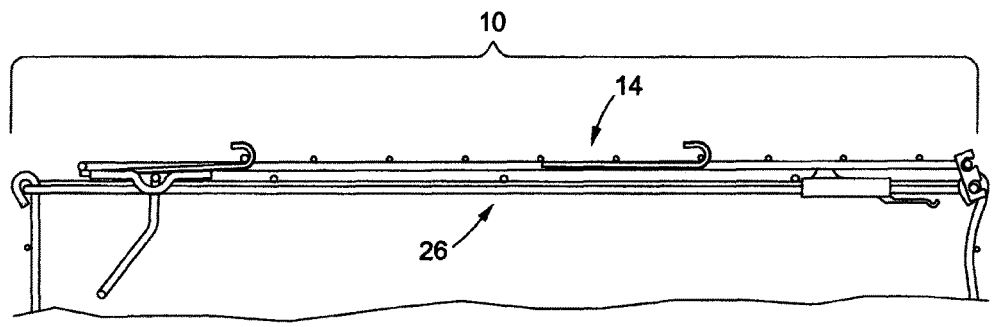
FIG. 7 is a cross-sectional view of a top panel and the door with the door disposed on the top panel and rotated to the opened position.

To open the door 14, the user grasps the handle 34 and slides the handle 34 to the left. By doing so, a rod 36 of the handle 34 is moved out of a catch 40 attached to the side panel 16. Otherwise, the door 14 cannot be traversed upward due to the engagement of the rod 36 in the catch 40. With the rod 36 disposed out of the catch 40, the user may lift the door 14 upward as shown in FIGS. 4 and 5. The inverted hooks 22 of the door disengage the horizontal wire rods 24 of the side panel in that the distal end 42 of the hook 22 is now disposed at a higher elevation compared to the wire rod 24 of the side panel 16 so that the door 14 may be rotated in the direction of arrow 44 (see FIG. 6) and disposed on the top panel 26 of the pet enclosure 10 (see FIG. 7).

Figure 3:
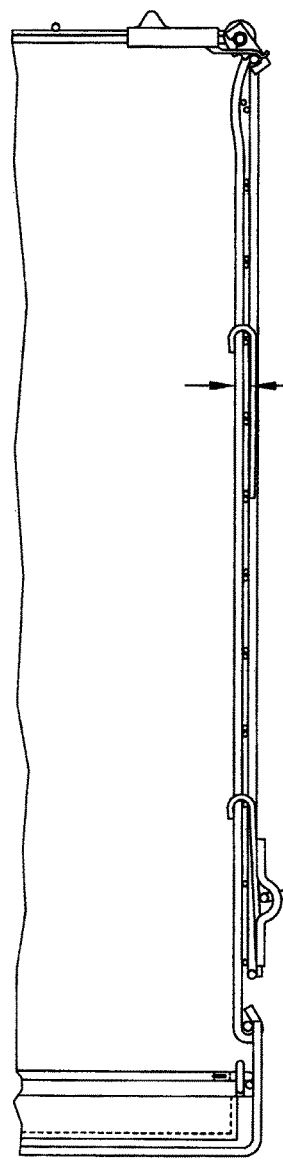
FIG. 3 is a cross-sectional configuration of the side panel and door shown in FIG. 1.

In order to traverse the door 14 upward as shown in FIGS. 3-5, the door 14 may be attached to an upper corner 48 of the enclosure 10. By way of example and not limitation, the door 14 may be rotatably attached to either the upper portion of the side panel 16 (i.e., uppermost wire rod) or the front portion of the top panel 26 (i.e., edge wire rod). FIG. 1 illustrates four dual axes connectors 46 rotatably attaching the door 14 to the upper corner 48 of the enclosure 10. In the embodiment shown in FIG. 1, the dual axes connector 46 is used to rotatably attach the door 14 to the front edge wire rod 50 of the top panel 26.

Referring now to FIGS. 8A-8D, an enlarged perspective view of the dual axes connector 46 is shown. The dual axes connector 46 may define first and second grooves 52, 54 that define the first and second rotational axes 18, 20. The wire rod 56 of the door 14 is inserted into the second groove 54. By way of example and not limitation, the topmost wire rod 56 is inserted into the second groove 54. However, it is also contemplated that any of the wire rods 24 near the upper portion of the door 14 may be inserted into the second grooves 54 of the dual axes connector 46. A wire rod 50 in the upper corner of the enclosure 10 is inserted into the first groove 52. By way of example and not limitation, the edge rod 50 of the top panel 26 or the uppermost rod of the front panel may be inserted into the first groove 52 of the dual axes connector 46. Accordingly, the door 14 may pivot about the first and/or second axes 18, 20 defined by the first and second grooves 52, 54 of the dual axes connector 46.

Figure 8A:
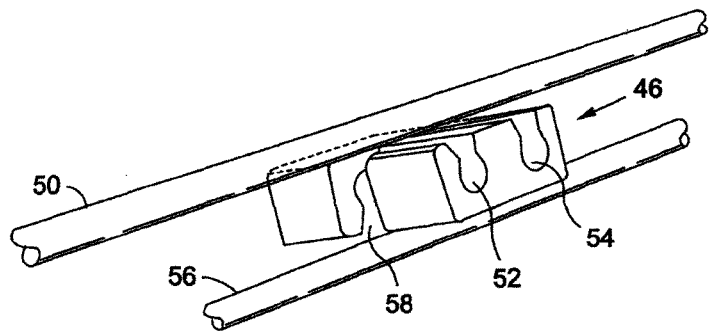
FIG. 8A is a perspective view of a dual axes connector for rotatably connecting the door to an upper corner region of the side panel and top panel with a dual axes connector being inserted between two wire rods.
Figure 8B:
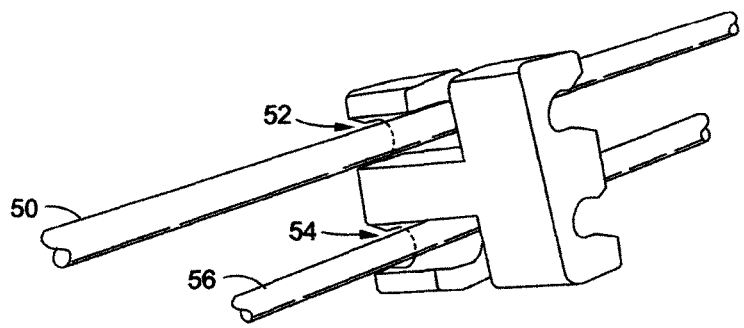
FIG. 8B is a perspective view of the dual axes connector shown in FIG. 8A with the dual axes connector being rotated to align first and second grooves to the wire rods.
Figure 8C:
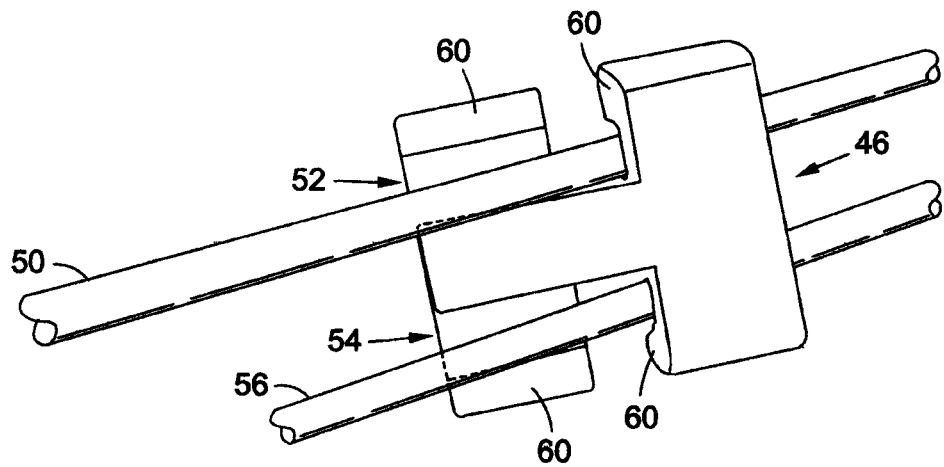
FIG. 8C is a perspective view of the dual axes connector shown in FIG. 8B with the dual axes connector being further rotated to insert the wire rods into the first and second grooves.
Figure 8D:
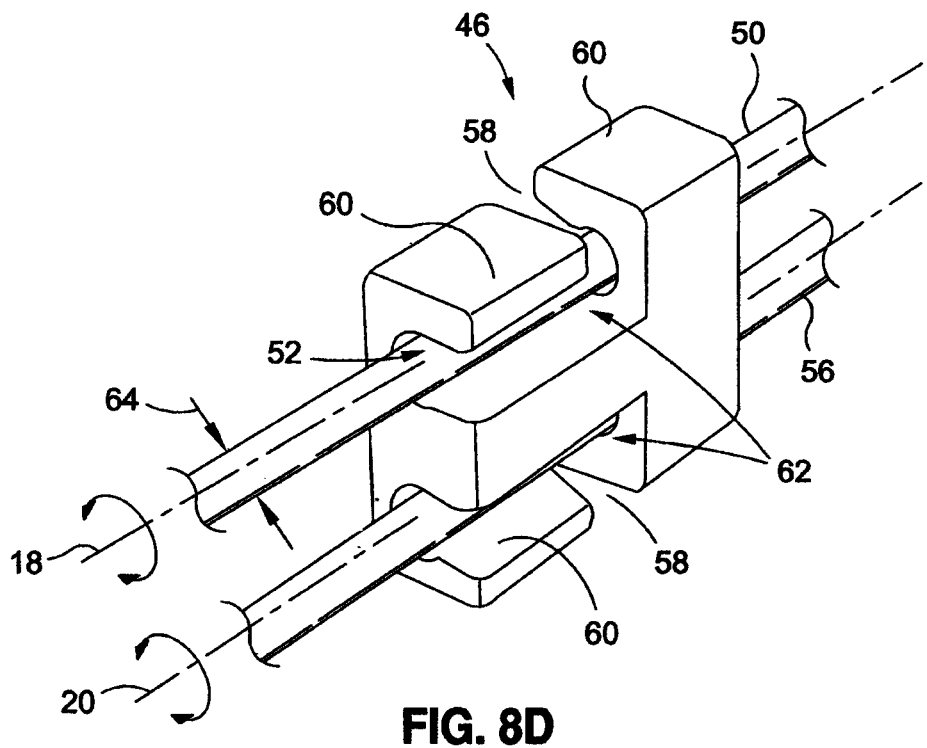
FIG. 8D is a perspective view of the dual axes connector shown in FIG. 8D with the wire rods fully inserted into the first and second grooves.

To insert the respective wire rods 24 into the first and second grooves 52, 54 of the dual axes connector 46, the dual axes connector 46 is inserted between the two wire rods 50, 56 until the wire rods 50, 56 are aligned to notches 58, as shown in FIG. 8A. The dual axes connector 46 is then rotated to align the wire rods 50, 56 to the first and second grooves 52, 54, as shown in FIG. 8B. The dual axes connector 46 is then rotated in order to snap the wire rods 50, 56 into the first and second grooves 52, 54. The outer flanges 60 may flex outward then snap inward in order to retain the wire rods 50, 56 in their respective grooves 52, 54. The entryway 62 of the grooves 52, 54 may be smaller than a diameter 64 of the wire rods 50, 56 and pass into a cavity which is sized and configured to receive the wire rods 50, 56. As such, when the flanges 60 snap back into place after the wire rods 50, 56 enter the cavity, the wire rods 50, 56 are retained within the cavity and are allowed to freely rotate to allow for rotational pivoting of the door 14 about pivot axes 18, 20.

The dual axes connector 46 is rotatably attached to the wire rod 50 so that the wire rod 56 of the door 14 rotates thereabout. In this regard, the wire rod 56 has a vertical component as the dual axes connector 46 rotates about the wire rod 50. It is this vertical component that defines the vertical traversal of the door 14 which is shown in FIGS. 3-5.

Figure 9:
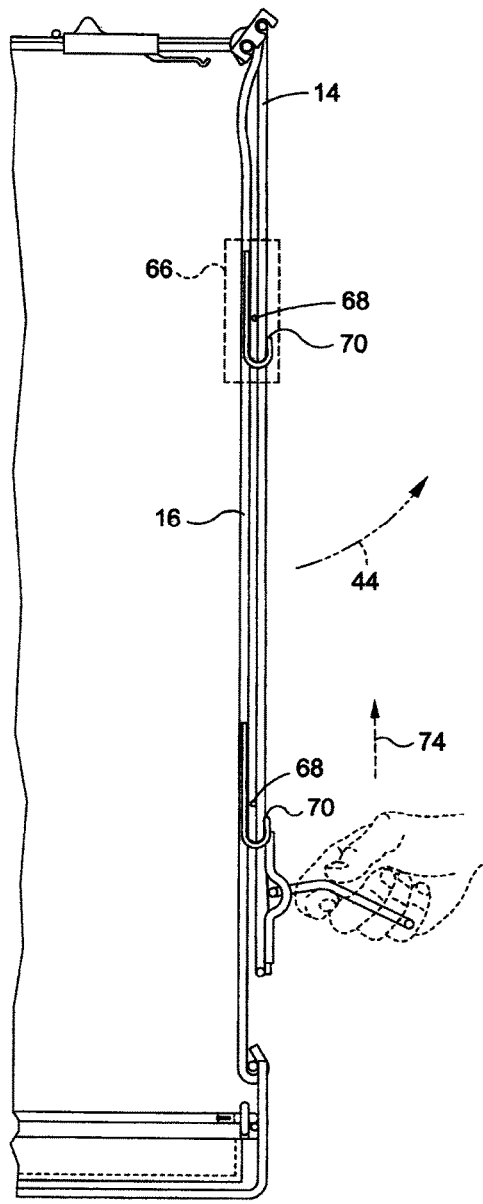
FIG. 9 is a cross-sectional view of the side panel and door illustrating an upright hook.
Figure 10:
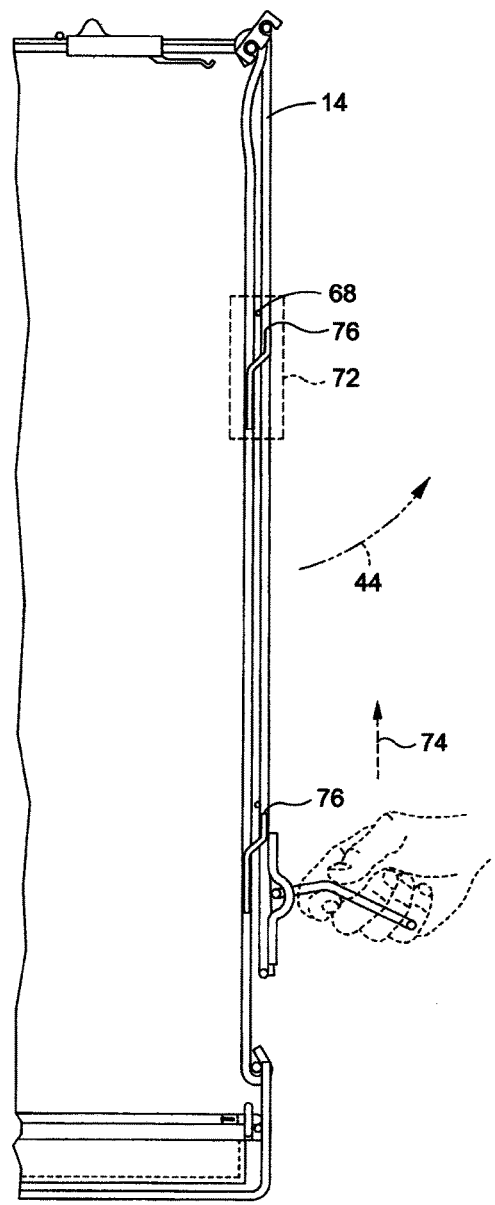
FIG. 10 is a cross-sectional view of the side panel and door illustrating an inverted tab.
Figure 11:
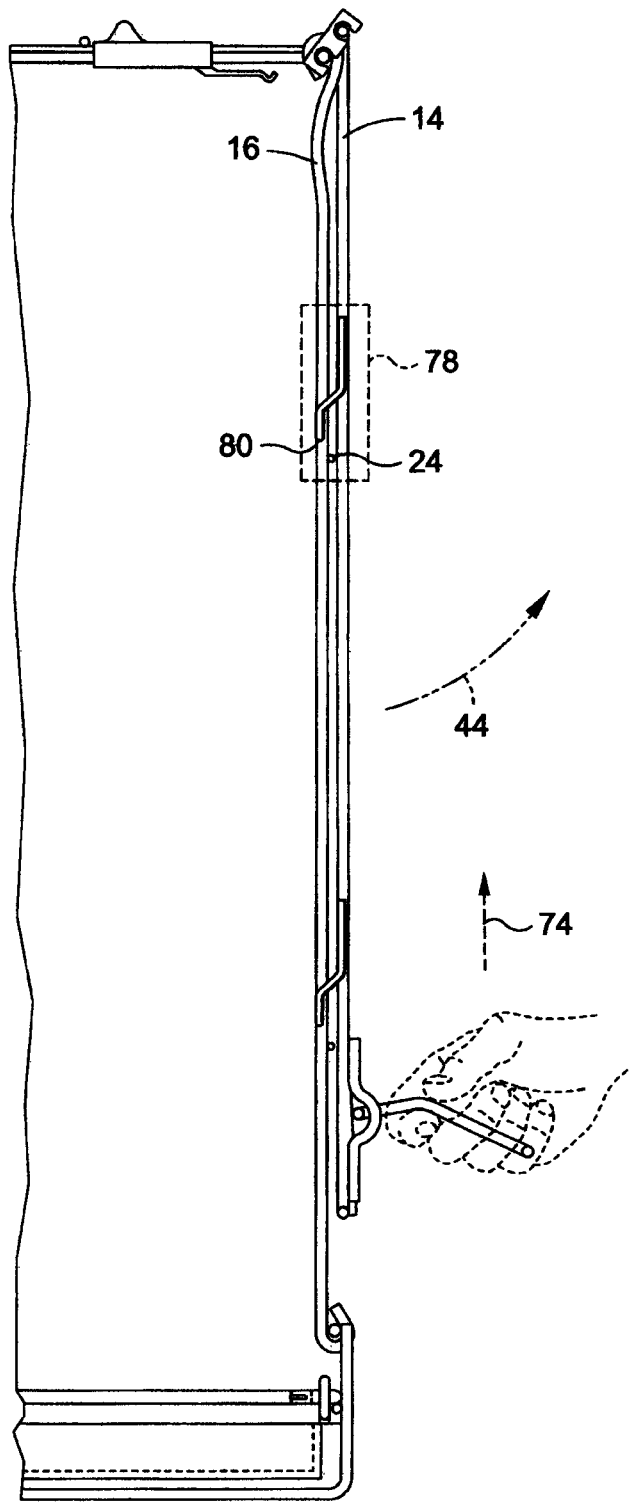
FIG. 11 is a cross-sectional view of the side panel and door illustrating an upright tab.

Referring now to FIGS. 9-11, alternative configurations to the inverted hook 20 are shown. In FIG. 9, upright clip 66 is shown. The upright clips 66 are distributed about a periphery of the door opening 12 on the side panel 16. Instead of the hook 22 opening being oriented downward, the opening of the month of the upright hook 66 points upward. To open the door 14, the user lifts the door 14 upward in the direction of arrow 74. When the user lifts the door 14 upward, the hooks 66 remain stationary on the side panel 16 while the horizontal wire rods 68 are vertically traversed above a distal end 70 of the upright hooks 66 so that the user can then rotate the door 14 in the direction of arrow 44.

In FIG. 10, instead of hooks, upright tabs 72 are shown. These tabs 72 are secured to the periphery of the door opening 12 on the side panel 16. The side panel 16 and the upright tab 72 form an opening that points upward so that as the user lifts the door 14 upward in the direction of arrow 74, the horizontal wire rod 68 of the door 14 that is trapped behind the tab 72 clears the distal end 76 so that the door 14 can now be rotated in the direction of arrow 44 as previously explained.

In FIG. 11, an inverted tab 78 is shown. The tab 78 is secured to the periphery of the door 14 in a similar fashion that the inverted hooks 22 are secured to the periphery of the door 14. When the door 14 is in the closed position, the horizontal wire rods 24 are disposed behind the inverted tab 76. When the user lifts the door 14 upward in the direction of arrow 74, the inverted tab 78 clears the horizontal wire rod 24 of the side panel 16 in that the distal end 80 of the tab 78 is elevated to a position higher than the horizontal wire rod 24 so that the door 14 can be pivoted in the direction of arrow 44.

Figure 12:
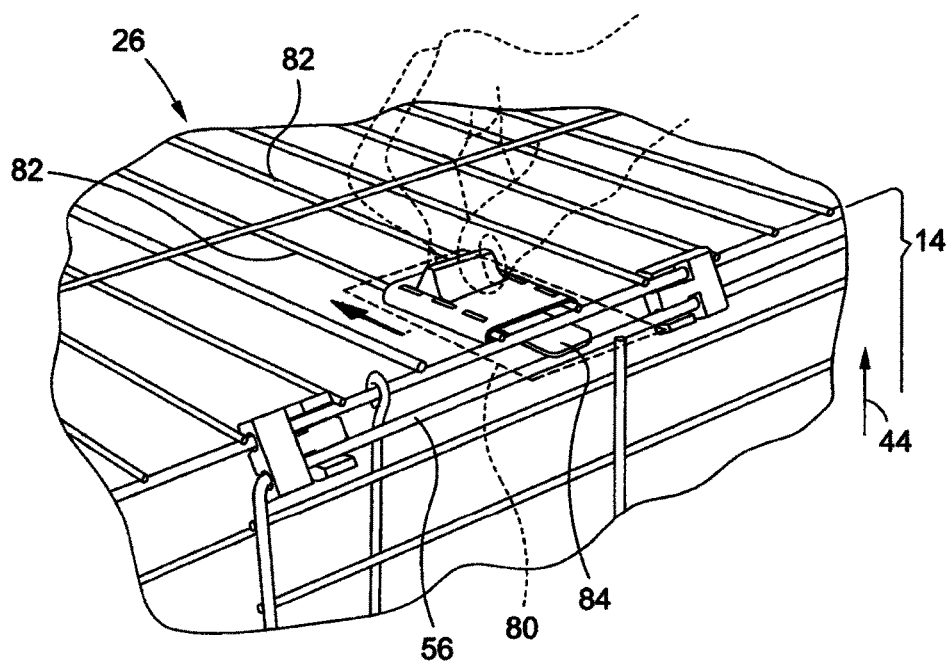
FIG. 12 is a perspective view of a mechanism for preventing upward traversal of the door with the mechanism being in an engaged position.
Figure 13:
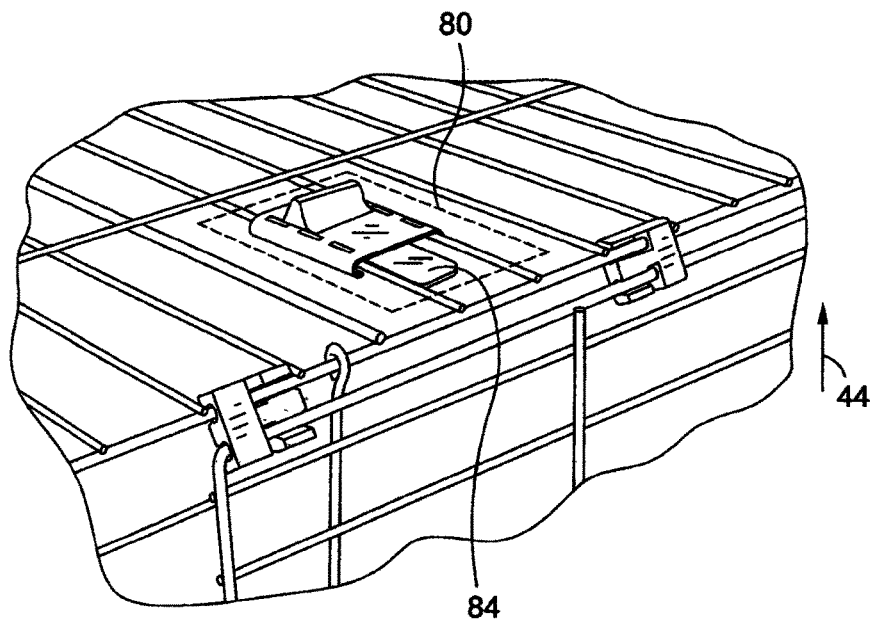
FIG. 13 is a perspective view of the mechanism in a disengaged position.

Referring now to FIGS. 12 and 13, a mechanism 80 for preventing the upward movement of the door 14 in the direction of arrow 44 is shown. The mechanism 80 is slidable along a transverse wire rod 82 of the top panel 26. In the engaged position shown in FIG. 12, the mechanism has a tab 84 that extends over the topmost wire rod 56 of the door 14 when the door 14 is in the closed position. If the user attempts to lift the door 14 in the direction of arrow 44, the topmost wire rod 56 of the door 14 contacts the tab 84 and prevents the upward traversal 44 of the door 14. As a result, the inverted hooks 22, upright hooks 66, upright tab 72 and the inverted tab 78 may not be disengaged from the respective horizontal wire rod 24, 68. To traverse the door 14 to the opened position, the user must move the mechanism 80 backward as shown in FIG. 13 so that the tab 84 is no longer blocking the topmost wire rod 56 of the door 14. FIGS. 12 and 13 illustrate a single mechanism 80. However, it is also contemplated that a plurality of mechanisms 80 may be implemented in the pet enclosure 10, as shown in FIG. 1.

The dual axes connector 46 shown in FIG. 8 illustrates one embodiment of the dual axes connector 46. However, other configurations of the dual axes connector 46 are also contemplated. By way of example and not limitation, the dual axes connector 46 may incorporate any of the dual axes pivot mechanisms shown and described in U.S. patent application Ser. No. 14/190,371, filed on Feb. 26, 2014, the entire contents of which are expressly incorporated herein by reference.

The above description is given by way of example, and not limitation. Given the above disclosure, one skilled in the art could devise variations that are within the scope and spirit of the invention disclosed herein, including various ways of forming the door 14 and panels. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:
1. An enclosure for a pet, the enclosure comprising:
a plurality of side panels defining an enclosed area, each side panel formed from a plurality of horizontal and vertical wire rods, a first side panel of the plurality of side panels having a door opening for ingress and egress of the pet into and out of the enclosed area and defining a vertical plane;
a door pivotally attached to a first wire rod of the first side panel disposed in an upper corner region of the first side panel and a top panel of the plurality of side panels, the door being traversable between a closed position and an opened position, the door at least partially overlapping the horizontal wire rods of the first side panel and covering the door opening to prevent ingress and egress of the pet through the door opening when the door is traversed to the closed position;
a pivot attachment mechanism having first and second pivot grooves defining first and second pivot axes which are parallel to each other and set apart by a first distance, the first pivot groove accepting the first wire rod of the first side panel and the second pivot groove accepting an upper wire rod of the door so that the first pivot groove is aligned with the vertical plane of the first side panel and the second pivot groove is offset from the vertical plane when the enclosure is in an upright and installed state;

a vertical latch fixedly attached to the door or the first side panel so that the vertical latch remains stationary with respect to the door or the first side panel while the door is operated between an opened position and a closed position, the vertical latch being engaged with a second horizontal wire rod of the first side panel or the door when the door is in the closed position, the vertical latch being disengaged with the second horizontal wire rod of the first side panel or the door when the door is in the opened position; the first distance between the first and second axes of the pivot attachment mechanism providing for vertical traversal of the door so that the latch vertically clears the second horizontal wire rod of the door or the first side panel to disengage the vertical latch from the second horizontal wire rod of the first side panel or the door to traverse the door to the opened position; and a latching mechanism disposed on one of the door and the top panel, the latching mechanism being slidable to a position between the first and second pivot axes of the pivot attachment mechanism to prevent traversal of the door.

2. The enclosure of claim 1 wherein
the vertical latch is an upright hook attached to the door which is removably engageable to the second horizontal wire rod of the first side panel.

3. The enclosure of claim 1 wherein
the vertical latch is an inverted tab attached to the door which is removably engageable to the second wire rod of the first side panel.

4. An enclosure for a pet, the enclosure comprising:
a plurality of side panels defining an enclosed area, each side panel formed from a plurality of horizontal and vertical wire rods, a first side panel of the plurality of side panels having a door opening for ingress and egress of the pet into and out of the enclosed area and defining a vertical plane;

a door pivotally attached to a first wire rod of the first side panel disposed in an upper corner region of the first side panel and a top panel of the plurality of side panels, the door being traversable between a closed position and an opened position, the door at least partially overlapping the horizontal wire rods of the first side panel and covering the door opening to prevent ingress and egress of the pet through the door opening when the door is traversed to the closed position;

a pivot attachment mechanism having first and second pivot grooves defining first and second pivot axes which are parallel to each other and set apart by a first distance, the first pivot groove accepting the first wire rod of the first side panel and the second pivot groove accepting an upper wire rod of the door so that the first pivot groove is aligned with the vertical plane of the first side panel and the second pivot groove is offset from the vertical plane when the enclosure is in an upright and installed state;

a vertical latch fixedly attached to the first side panel so that the vertical latch remains stationary with respect to the first side panel while the door is operated between an opened position and a closed position, the vertical latch being engaged with a second horizontal wire rod of the door when the door is in the closed position, the vertical latch being disengaged with the second horizontal wire rod of the door when the door is in the opened position; the first distance between the first and second axes of the pivot attachment mechanism providing for vertical traversal of the door so that the latch vertically clears the second horizontal wire rod of the door to disengage the vertical latch from the second horizontal wire rod of the door to traverse the door to the opened position, the vertical latch being an upright tab attached to the first side panel which is removably engageable to the second wire rod of the door; and a latching mechanism disposed on one of the door and the top panel, the latching mechanism being slidable to a position between the first and second pivot axes of the pivot attachment mechanism to prevent traversal of the door.

5. The enclosure of claim 1 wherein
the vertical latch includes an inverted hook, and the first distance between the first and second grooves is ½ or more a depth of an opening of the inverted hook so that the inverted hook clears the second horizontal wire rod when vertically traversing the door.

6. The enclosure of claim 1 wherein
a plurality of pivot attachment mechanisms pivotally attach the door to the upper corner region, a plurality of the vertical latches are disposed about the left and right sides of the door or door opening and at least one of the plurality of vertical latches is disposed adjacent to a lower edge portion of the door for providing reinforcement to all four sides of the door.

7. The enclosure of claim 1 wherein
the first wire rod is rotatably and snap fitably disposed within the first groove and the upper wire rod of the door is rotatably and snap fitably disposed within the second groove.

8. The enclosure of claim 1 wherein
the door pivots about the pivot attachment mechanism during vertical traversal of the door.

9. An enclosure for a pet, the enclosure comprising:
a plurality of side panels defining an enclosed area, each side panel formed from a plurality of horizontal and vertical wire rods, a first side panel of the plurality of side panels having a door opening for ingress and egress of the pet into and out of the enclosed area and defining a vertical plane;

a door pivotally attached to a first wire rod of the first side panel disposed in an upper corner region of the first side panel and a top panel of the plurality of side panels, the door being traversable between a closed position and an opened position, the door at least partially overlapping the horizontal wire rods of the first side panel and covering the door opening to prevent ingress and egress of the pet through the door opening when the door is traversed to the closed position;

a pivot attachment mechanism having first and second pivot grooves defining first and second pivot axes which are parallel to each other and set apart by a first distance, the first pivot groove accepting the first wire rod of the first side panel and the second pivot groove accepting an upper wire rod of the door, the first pivot groove being aligned with the vertical plane of the first side panel, the second pivot groove being offset from the vertical plane when the enclosure is in an upright and installed state; and a latching mechanism disposed on one of the door and the top panel, the latching mechanism being slidable to a position between the first and second pivot axes of the pivot attachment mechanism to prevent traversal of the door.

10. The enclosure for a pet of claim 9, wherein a portion of the latching mechanism is fixedly disposed on the top panel.

11. The enclosure for a pet of claim 10, wherein the latching mechanism includes a tab, the tab being slidable between the first and second pivot axes of the pivot attachment mechanism to prevent traversal of the door.

\* \* \* \* \*